July 3, 1962 P. A. GUINARD 3,042,063
DISTRIBUTING DEVICE
Filed Oct. 8, 1958 3 Sheets-Sheet 1

July 3, 1962   P. A. GUINARD   3,042,063
DISTRIBUTING DEVICE
Filed Oct. 8, 1958   3 Sheets-Sheet 2

United States Patent Office 3,042,063
Patented July 3, 1962

3,042,063
DISTRIBUTING DEVICE
Paul André Guinard, 7 Ave. Pozzo di Borgo,
Saint-Cloud, France
Filed Oct. 8, 1958, Ser. No. 766,092
Claims priority, application France Oct. 11, 1957
2 Claims. (Cl. 137—115)

One object of the invention is to realize a distributing device which can be used generally but is particularly intended to fit out groups of spraying motor-pumps, on the one hand to control the parts which supply with a fluid under pressure the spraying branch-pipes or ramps and, on the other hand, to avoid overloading the motors of these groups when these supply parts are cut off.

Another object of the invention is the combination in a distributing device of a lever controlling the parts supplying with a fluid under pressure several receiving apparatus with a calibrated discharge valve subjected to the pressure of this fluid and with an elastically distortable membrane having a section greater than the valve and subjected to the fluid pressure on both of its faces when at least one of the supply parts is open and on only one of its faces when all the supply parts are cut off, whereby said membrane in this last occurrence moves and operates, through a push-rod, the valve so as to produce a pressure drop.

A further object of the invention is to realize a distributing device presenting the following features, separately or in their various combinations:

(a) The control lever is provided with slanting ramps and may be placed in at least three different chief positions corresponding respectively to:

The setting out of action of all the supply parts;
The setting into action of at least one of these parts;
The setting into action of all the supply parts.

(b) The control lever is provided with slanting ramps acting, against the action of springs, upon the ends of stems of clack-valves which form the supply parts.

(c) The supply valves are located in a chamber receiving the fluid under pressure, said chamber including an aperture which forms a seat for a discharge valve the calibration of which can be adjusted.

(d) The intake of the fluid under pressure in the reception chamber takes place through a tubular member which constitutes a push-rod for the discharge valve and is centrally engaged through the elastically distortable membrane with which it is connected, said membrane being tightly held in position along its periphery.

(e) The supply valves, when open, give access to intake channels of the receiving apparatus; these channels are connected, through preferably calibrated ports, with an intermediate space, which is provided with a free selection ball and communicates with a chamber corresponding to the face of the membrane opposite to the face thereof which is constantly submitted to the fluid pressure.

(f) Two supply valves and two intake channels for the receiving apparatus are provided, these two intake channels being constituted by a same bore, in the central part of which are disposed two pieces provided with the calibrated ports and limiting the intermediate space in which the selection ball is placed.

Further objects and advantages of the invention will appear from the following description of an embodiment, with reference to the annexed drawing in which.

Figure 1:
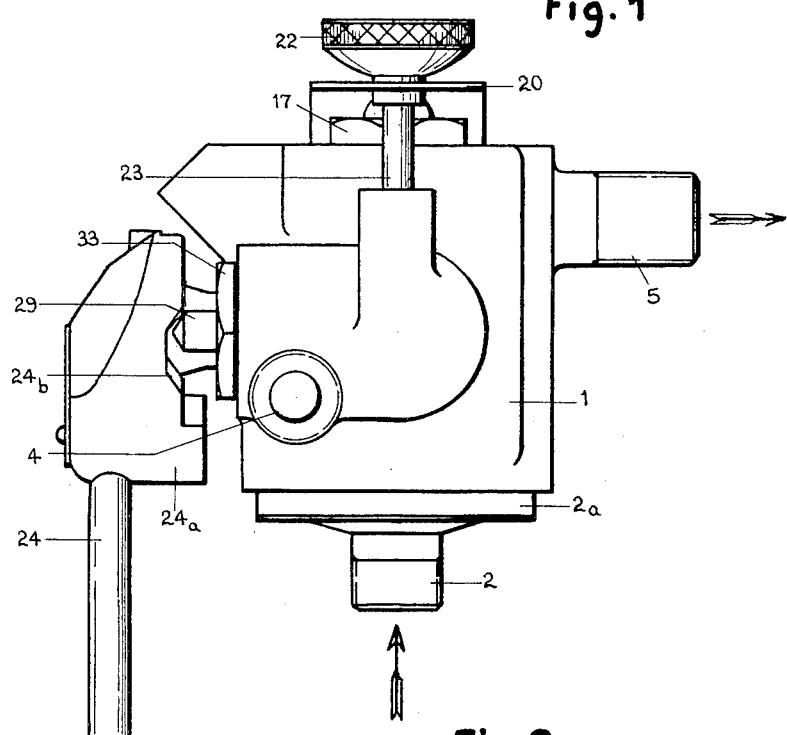
FIGURE 1 is an elevational view of the whole of a distributing device according to the invention.

The distributing device, represented only by way of example on the annexed drawing, includes a body 1, which is shaped so as to receive a piece 2a forming the inlet 2 for the fluid under pressure and so as to constitute channel 3, 4 distributing said fluid to receiving apparatus, such as spraying branch-pipes or ramps, said channels 3, 4 being formed by a same bore, and so as to constitute a discharge pipe 5. The piece 2a, when set in position, clamps peripherally and tightly an elastically distortable membrane 6. This membrane 6 supports centrally a piece 7 provided, on the one hand, with a bore 7a opening under the membrane and, on the other hand, with radial ports 7b opening in an admission chamber 8, the upper part of piece 7 being shaped so as to form a push-rod 7c. The piece 7 is tightly connected with the membrane 6 by means of discs 9, 10, which clamp said membrane. A guide 11 for piece 7 is screwed in body 1 and an air-tight ring 12 is provided to tighten the chamber 13 limited by the upper face of the membrane 6.

An annular piece 14, mounted in body 1, constitutes a seat for a discharge valve 15 movable in a chamber 16, in which the discharge pipe 5 opens, said valve 15 being guided in a piece 17 screwed in body 1. Air-tight rings, made of an elastically distortable material, are provided at 18 and 19. A plate-spring 20 is fixed at one end upon the body 1 by a screw 21 and, at its other end, bears upon an adjusting knob 22 screwed on a stem 23 fixed in body 1. The mean part of the plate-spring 20 rests upon the spherical end of valve 15 and the calibration tension can be adjusted by means of knob 22.

The manually operated control member, which is constituted by a lever 24 the head 24a of which is provided with a slanting ramps 24b, is mounted on a spindle 26 fixed in body 1, a check-nut with a washer 27 being provided at 28. The slanting ramps 24b can bear upon one of the ends of stems 29 provided, at their other ends, with clack-valves 30, which are normally pushed in shutting position by springs 31. The stems 29 are guided, with the interposition of tight rings 32, in pieces 33 which forms seats for clack-valves 30. Each piece 33 is screwed in body 1 and guided, outside of a space 34, in a corresponding bore in the body 1, a tight ring being provided at 35. In addition, each piece 33 has radial perforations 33a opening in the corresponding spaces 34. Each of the channels 3, 4, which are coaxial and constituted by the same bore, opens in one of the spaces 34.

Before mounting pieces 33, a selection ball 36 and two pieces 37 and 38, which present converging and diverging bores connected by calibrated passages 37a, 38a, are inserted in the central part of the common channel bore 3—4, tight joints being provided at 39 and 40.

Figure 2:
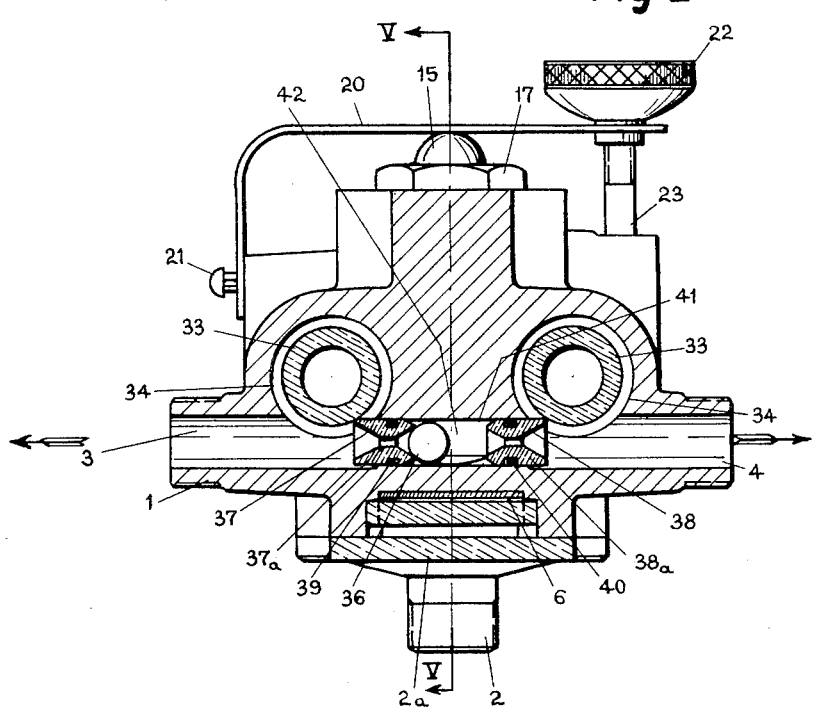
FIGURE 2 is a section taken along line II—II of FIGURE 4.
Figure 3:
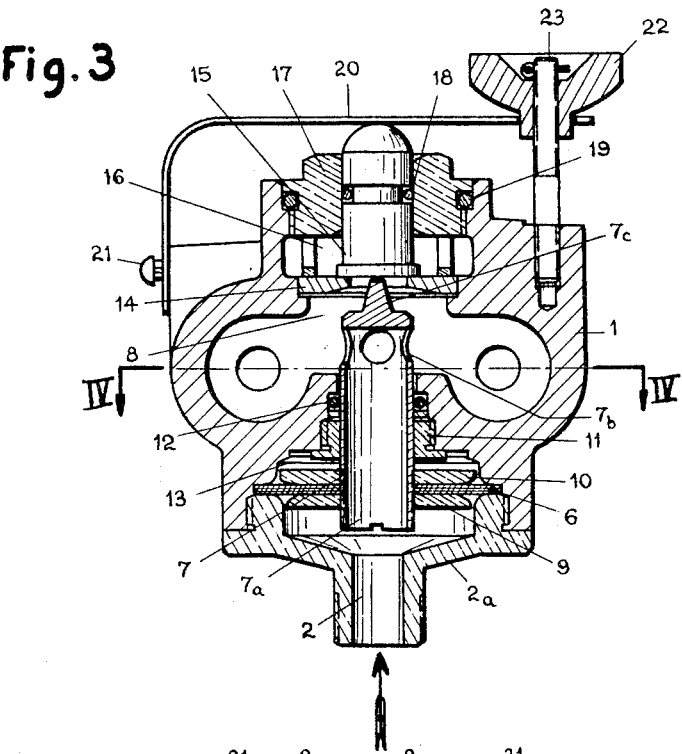
FIGURE 3 is a section taken along line III—III of FIGURE 4.
Figure 4:
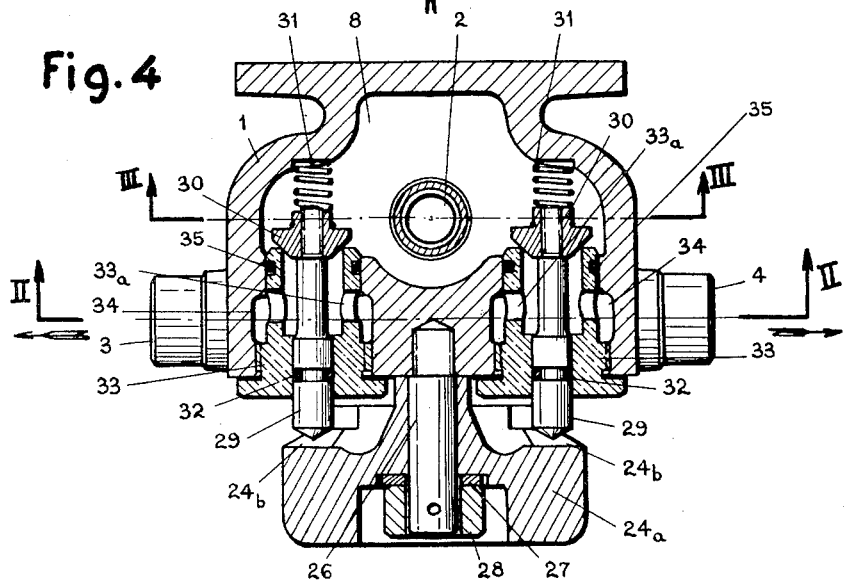
FIGURE 4 is a section taken along line IV—IV of FIGURE 3.
Figure 5:
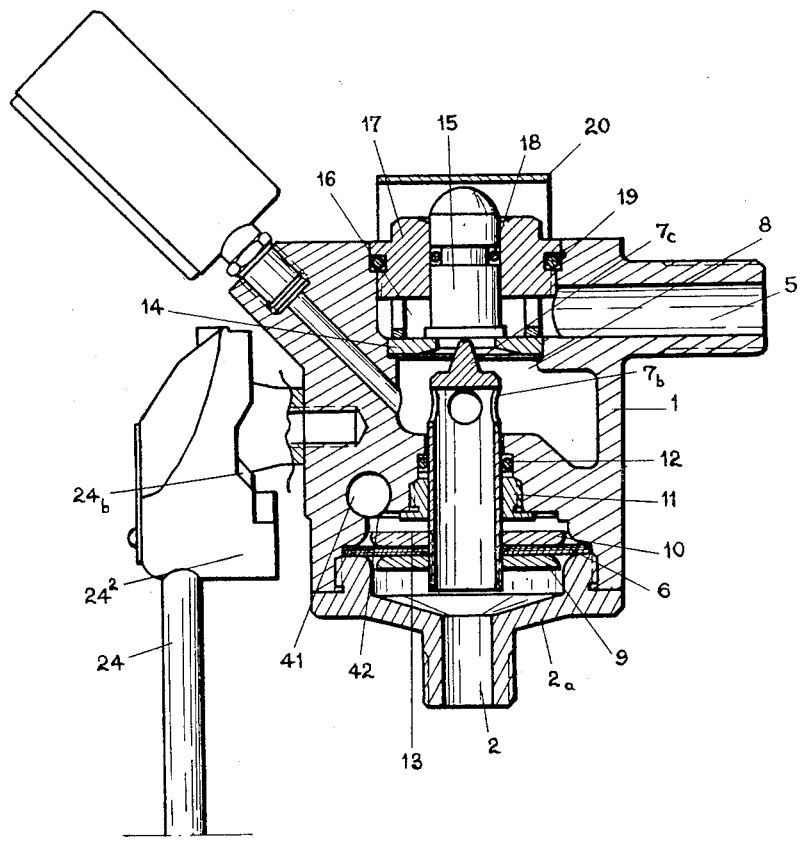
FIGURE 5 is a cross-section taken along line V—V of FIGURE 4.

In addition, chamber 13 located above membrane 6 is permanently connected with the space 41 limited by pieces 37 and 38, as shown at 42 (FIGURES 2 and 5).

In the embodiment above described, two distributing parts constituted by the clack-valves 30 intended to feed spraying branch-pipes or ramps have been provided, but it is also possible, without departing from the scope of the invention, to provide more than two distributing parts, the slanting ramps of the manually operated control lever being shaped accordingly to perform the required openings and shuttings.

The distributing device above described works as follows:

The fluid, such as a liquid intended for cryptogamic treatments, is supplied under pressure by a motor-pump and flows through inlet pipe 2 in the distributing device, which is generally mounted upon said motor-pump.

The fluid under pressure flows through bore 7a and radial ports 7b in admission chamber 8 in which the distributing clack-valves 30 are disposed.

According to the position of the control lever 24, three events are possible:

Both valves 30 are opened;
Only one valve 30 is opened;
Both valves 30 are cut off.

In the first event, both valves 30 being opened, the fluid under pressure flows out from the admission chamber 8, through the bore in the pieces 33 and the radial perforations 33a, in spaces 34 and, afterwards, through channels 3, 4 towards receiving apparatus such as branch pipes or ramps. In addition, the fluid under pressure flows, through calibrated passages 37a and 38a, in space 41 limited by pieces 37, 38 and from this space, through 42, in chamber 13 located above membrane 6. Thereby the pressure is exerted upon both sides of membrane 6. This membrane remains motionless and has no action, through push-rod 7c, upon discharge valve 15. The distributing device operates merely as a discharge valve. In the case of small overpressures, exceeding the calibration of valve 15, previously adjusted by means of knob 22, said valve 15 opens and the fluid escapes from chamber 16 into discharge pipe 5.

If one of the valves 30, the left valve for instance, is cut off by actuating lever 24, the fluid flows only in space 34 on the right side, channel 4 and passage 38a. The selection ball 36 is moved towards the left, thus closing passage 37a, as shown in FIG. 2, so as to cut off any feeding of channel 34. The space 41 remains in communication with chamber 13 above membrane 6, whereby the pressure is maintained upon membrane 6; this membrane has still no action on valve 15 which operates merely as a discharge valve, as previously indicated.

If both valves 30 are cut off, by actuating lever 24 channels 3 and 4 are no more supplied with fluid under pressure, and the same space 41 which is in communication with at least one of the passages 37a and 38a, according to the position of the selection ball 36: the fluid under pressure acts no longer, through space 41 and channel 42, in chamber 13 located above membrane 6. The fluid pressure acts exclusively upon the lower face of membrane 6; this membrane is distorted upwards and moves piece 7 and push-rod 7c which directly lifts up valve 15. An immediate pressure drop in chamber 8 is thus obtained, whereby an overload of the motor is avoided.

The embodiment above described and illustrated has been chosen only as an example. More generally, any modified embodiment presenting the above displayed characteristics with the same aim in view remains within the scope of the present invention.

What I claim is:

1. Distributing device for fluids under pressure provided with discharge means, particularly for the fitting out of spraying motor-pump groups, including a body in which is provided a central bore with an enlarged internally threaded end, a discharge valve disposed at the other end of said bore and including a plate-shaped closing spring fixed at one end upon said body, provided at the other end with a regulating screw and arranged so as to bear with its central part upon the head of the discharge valve, a tubular member sliding in said bore and including at its end a push-rod contacting said discharge valve, an annular elastic membrane fixed upon said tubular member, a nut formed piece screwed in the enlarged end of the central bore to tighten the periphery of said membrane against the body, an inlet pipe for the fluid under pressure provided in said nut formed piece, so as to subject one face of said membrane to the inlet pressure of the fluid, an admission chamber provided in the body around the tubular push-rod below the discharge valve, side ports provided in said tubular push-rod so as to connect the inlet pipe with said chamber, a transverse channel in the body, provided at both ends with distributing pipes, two spring loaded supply valves to connect the admission chamber with said channel close to the distributing pipes, means to selectively control the opening of said supply valves, a conduit connecting the central part of the transverse channel and the enlarged end of the central bore to transmit the pressure downstream of said supply valves to the face of the membrane opposite the face thereof subjected to the inlet pressure of the fluid, two pieces including converging-diverging passages and disposed in the transverse channel on either side of said conduit, and a ball freely disposed in the central part of said channel between said pieces.

2. Distributing device according to claim 1 in which the supply valves are provided with stems guided in the body of the device and the ends of which extend out of said body, said body including, to selectively control said supply valves, a lever fixed on an axis parallel to the axes of said stems, and journalled in the body of the distributing device, a head integral with said axis and upon the inner face of which are provided slanting ramps cooperating with the ends of the stems of the supply valves, said ramps being arranged so as to control selectively the simultaneous closing and opening of all said supply valves and the opening of either one of said supply valves.

References Cited in the file of this patent

UNITED STATES PATENTS

| | | |
|---|---|---|
| 862,867 | Eggleston | Aug. 6, 1907 |
| 2,433,471 | Mayer | Dec. 30, 1947 |
| 2,459,000 | Morris | Jan. 11, 1949 |
| 2,665,704 | Kanuch | Jan. 12, 1954 |
| 2,669,482 | Gold | Feb. 16, 1954 |
| 2,917,067 | Pearl | Dec. 15, 1959 |